(12) United States Patent
Schatz et al.

(10) Patent No.: US 8,678,297 B2
(45) Date of Patent: *Mar. 25, 2014

(54) CLAMP FOR CONNECTING A WIRE TO A RAIL

(76) Inventors: John Schatz, Commack, NY (US);
Walter W. Weiss, North Bellmore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,005

(22) Filed: Jul. 6, 2012

(65) Prior Publication Data

US 2012/0273629 A1   Nov. 1, 2012

Related U.S. Application Data

(63) Continuation of application No. 12/613,944, filed on Nov. 9, 2009, now Pat. No. 8,235,307.

(51) Int. Cl.
*B60M 5/00* (2006.01)

(52) U.S. Cl.
USPC .................. 238/14.14; 238/14.05; 24/457

(58) Field of Classification Search
USPC ........ 238/14.14, 14.05, 14.4, 14.5, 14.7, 14.8
See application file for complete search history.

(56) References Cited

U.S. PATENT DOCUMENTS

| | | | |
|---|---|---|---|
| 1,090,190 A | 3/1914 | Bell | |
| 1,199,620 A | 9/1916 | Shain | |
| 1,213,738 A | 1/1917 | Burge | |
| 1,755,765 A | 4/1930 | Bomig | |
| 1,833,835 A | 11/1931 | Hieronymus | |
| 2,529,153 A | 11/1950 | Hain | |
| 3,058,764 A | 10/1962 | Scott et al. | |
| 3,059,884 A | 10/1962 | Stanfill | |
| 4,776,808 A | 10/1988 | Davidson | |
| 4,826,078 A | 5/1989 | Arvin et al. | |
| 6,186,799 B1 | 2/2001 | Mello | |
| 6,244,517 B1 * | 6/2001 | Courtois et al. | 238/14.05 |
| 7,543,372 B2 | 6/2009 | Reichle | |
| 8,235,307 B2 * | 8/2012 | Schatz et al. | 238/14.14 |
| 2006/0032934 A1 | 2/2006 | Reichle | |
| 2008/0020612 A1 | 1/2008 | Clark et al. | |

* cited by examiner

*Primary Examiner* — S. Joseph Morano
*Assistant Examiner* — Zachary Kuhfuss
(74) *Attorney, Agent, or Firm* — Dilworth & Barrese, LLP.

(57) ABSTRACT

A clamp comprising a first end including a base and a hooked portion and a second end moveably connected to the base of the first end. The second end includes a clamped portion and a wire jaw maintaining a wire. The wire jaw is shaped so as to be placed in the second end. The wire jaw including a base and arms extending from the base. The arms defining an opening including teeth, the teeth effective to grip and provide high contact pressure on a rail. A spring is disposed on the base of the first end and is effective to bias the second end toward the hooked portion of the first end.

26 Claims, 3 Drawing Sheets

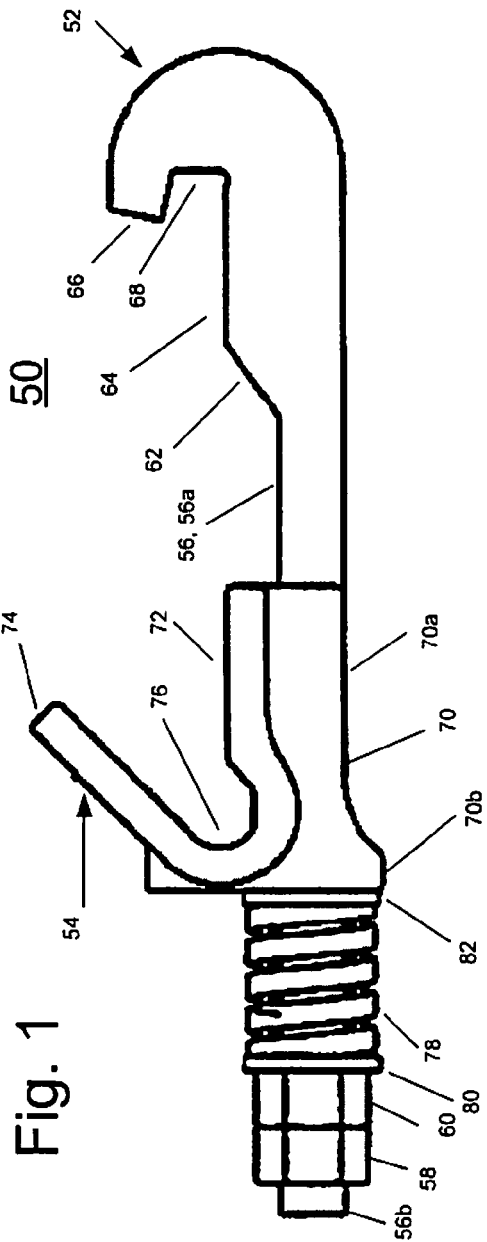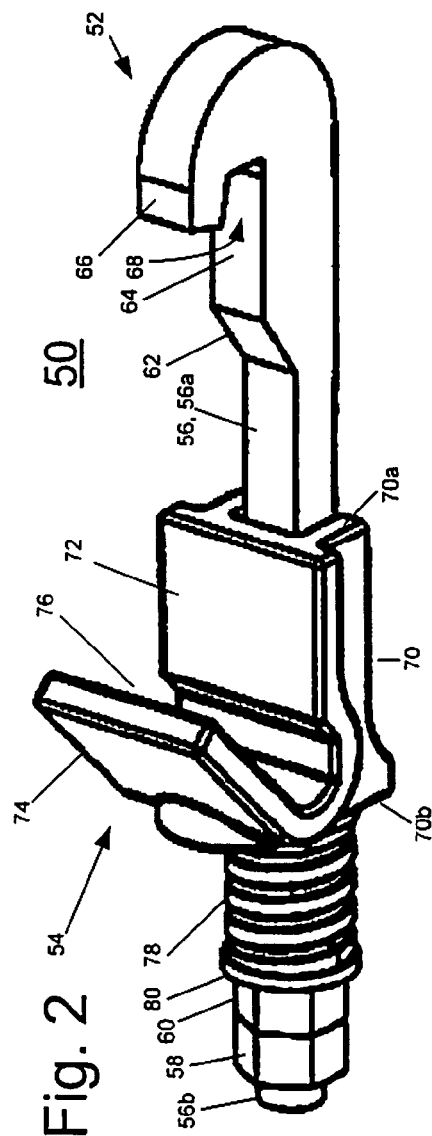

CLAMP FOR CONNECTING A WIRE TO A RAIL

PRIORITY

This is a continuation of U.S. patent application Ser. No. 12/613,944 filed Nov. 6, 2009 to which priority is claimed and which is herein incorporated by reference.

BACKGROUND OF THE INVENTION

This disclosure relates to a clamp for connecting a wire, such as a rail signal wire, to a rail.

Many modern railroad signal systems today employ a track circuit to detect the presence of a train within a section of track known as a signal block. An integral part of the track circuit is the two parallel running rails that a train runs on. Various types of signal apparatus are connected to these rails to complete the track circuit. Prior art techniques for connecting a wire to a rail include exothermic welding processes where the wire is welded to the rail. Other techniques include compressing a metal sleeve including the wire in a hole drilled in the rail or clamping a wire directly to the rail. This disclosure describes an improvement over these prior art techniques.

SUMMARY OF THE INVENTION

One embodiment of the invention is a clamp comprising a first end; a second end moveably connected to the first end; and a wire jaw maintaining a wire, the wire jaw shaped so as to be placed in the second end, the wire jaw including a base and arms extending from the base, the arms defining an opening including teeth, the teeth effective to grip an object.

Another embodiment of the invention is a method for installing a clamp, the clamp including a first end including a base and a hooked portion, and a second end moveably connected to the base of the first end, the second end including a clamped portion. The method comprises inserting a wire into a wire jaw, the wire jaw including a base and arms extending from the base, the arms defining an opening including teeth, the teeth effective to grip an object; attaching the hooked portion of the first end to an object; inserting the wire jaw into the second end, and biasing the second end toward the hooked portion of the first end.

Another embodiment of the invention is a combination of a clamp and a rail, the combination comprising a clamp including a first end including a base and a hooked portion; a second end moveably connected to the base of the first end, the second end including a clamped portion; a wire jaw maintaining a wire, the wire jaw placed in the second end, the wire jaw including a base and arms extending from the base, the arms defining an opening including teeth, the teeth effective to grip a rail; a spring disposed on the base of the first end, the spring effective to bias the second end toward the hooked portion of the first end. The rail including a first flange, a second flange and a bottom, the teeth being effective to grip the first flange; the first end includes a horizontal portion; the second end includes a flat portion substantially parallel to the flat portion of the first end; and the bottom of the rail sits on the flat portion of the first end and the flat portion of the second end.

BRIEF DESCRIPTION OF THE DRAWINGS

The drawings constitute a part of the specification and include exemplary embodiments of the present invention and illustrate various objects and features thereof.

FIG. 1 is side view of a clamp in accordance with an embodiment of the disclosure.

FIG. 2 is a perspective view of a clamp in accordance with an embodiment of the disclosure.

DETAILED DESCRIPTION OF THE PREFERRED EMBODIMENT(S)

Figure 3:
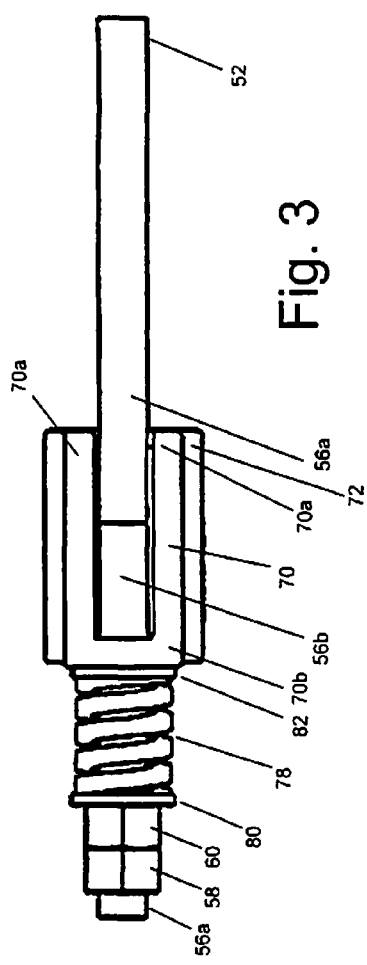
FIG. 3 is a bottom view of a clamp in accordance with an embodiment of the disclosure.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

The inventors have discovered that prior art techniques for connecting a wire to a rail are inadequate. Prior art techniques are expensive and time consuming and may require specialized skills and tools. Welding requires a particular skill set and tools. Clamps require an initial tightening of the clamp so that the connection is tight enough to withstand years of vibration by the rail. Prior art techniques may also cause degradation of the rail—such as the techniques involving welding or drilling holes. The limiting weight of a railroad train tends to be based on the weight carrying capacity of a rail. Many prior art techniques weaken the rail and thereby limit the size of a railroad train that can travel on the rail. Moreover, if the prior art techniques are performed incorrectly, which is a real concern considering the high skill required to implement them, wires may disconnect from the rail. This may result in a stop signal inhibiting movement of a train until a technician manually overrides the signal and/or reconnects the wire.

Figure 5:
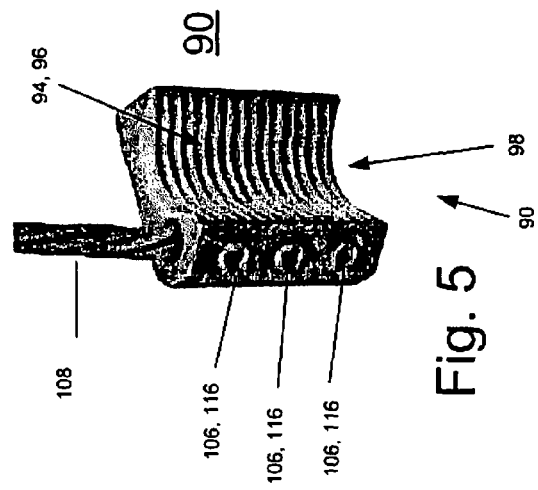
FIG. 5 is a perspective view of a wire jaw and wire in accordance with an embodiment of the disclosure.
Figure 6:
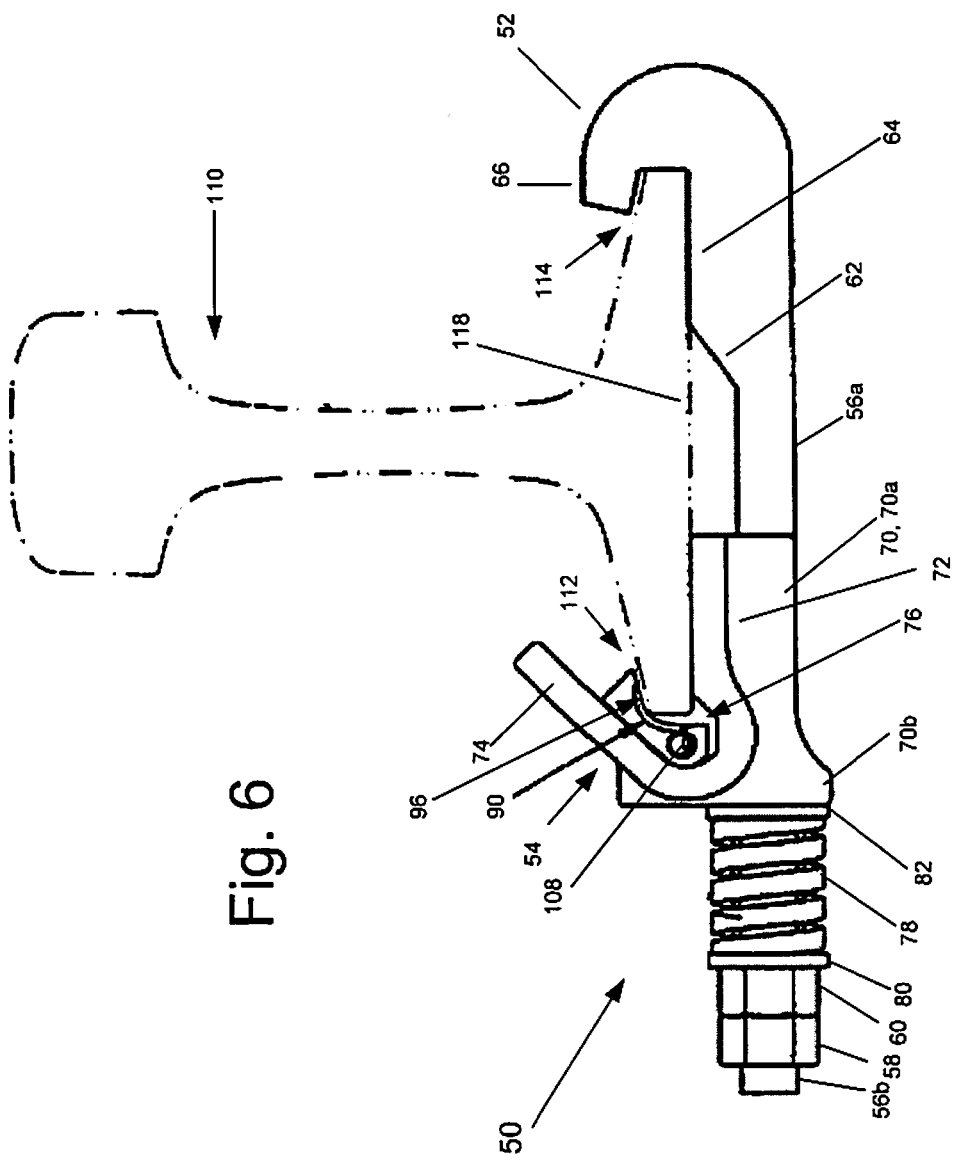
FIG. 6 is side view of a clamp, wire jaw and rail in accordance with an embodiment of the disclosure.

Referring to FIGS. 1-6, there is shown a clamp 50 in accordance with an embodiment of the disclosure. Clamp 50 includes a j-hooked end 52 and a clamped end 54. J-hooked end 52 includes a base 56 upon which clamped end 54 is moveably connected. Base 56 is, for example, substantially rectangular in cross-section at one end 56a and substantially circular in cross-section at another end 56b. End 56b of base 56 may be externally threaded to receive nuts 58, 60 discussed in more detail below. End 56a of base 56 extends upward into a slanted portion 62 and a horizontal portion 64 and terminates in a hooked portion 66 defining a recess 68. Recess 68 is designed so as to receive a flange of a rail profile (discussed below). Horizontal portion 64 aligns hooked end 52 with a bottom of a rail flange 118 (FIG. 6).

Clamped end 54 includes a base 70, a flat portion 72, and a hooked portion 74. Flat portion 72 sits on top of base 70 and may be, for example, made of the same material and/or integral with base 70. Flat portion 72 defines a plane that is substantially parallel to a plane defined by surface 64. Clamped end 54 terminates in hooked portion 74 defining a recess 76. Recess 76 is effective to receive a wire jaw 90 and a flange of a rail profile (both discussed below). Flat portion 72 aligns clamped end 54 with a bottom of the rail flange 118 (FIG. 6).

Clamped end 54 can move relative to j-hooked end 52 through connection of base 70 with base 56. One end 70a of base 70, proximate to hooked portion 66 has a substantially rectangular cross-section with a width wider than a width of end 56a of base 56 (best seen in FIGS. 2 and 3). Another end 70b of base 70 of clamped end 54 has walls defining a hole (not explicitly shown) effective to mate with end 56a of base 56. In this way, clamped end 54 is guided and moveably connected to j-hooked end 52.

A spring 78 may be used to bias clamped end 54 toward j-hooked end 52. Spring 78 has a hollow center and thus can be disposed on end 56b of base 56. Spring 78 could be, for example, a spring with a deflection to solid force of 1,092 pounds. Nuts 58, 60 may be threaded on end 56b to bias clamped end 54 toward j-hooked end 52 through spring 78 as discussed below. Washers 80, 82 may be provided around spring 78.

Figure 4:
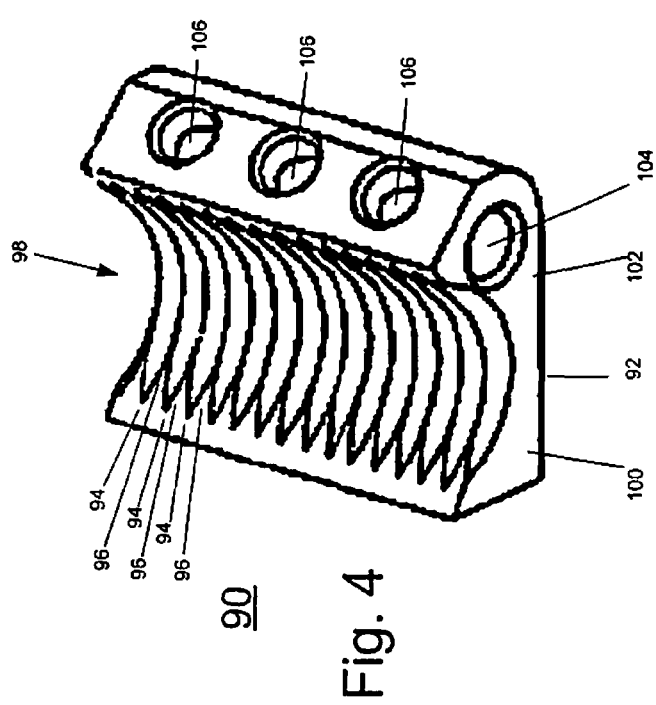
FIG. 4 is a perspective view of a wire jaw in accordance with an embodiment of the disclosure.

Referring to FIGS. 4 and 5, there is shown a wire jaw 90 which may be used in accordance with an embodiment of the disclosure. Wire jaw 90 is generally made of a conductive material such as steel with a conductive and corrosion resistant plating. The conductive plating increases the electrical conductivity of wire jaw 90, and in particular, between wire 108 and rail 110. Wire jaw 90 comprises a base 92 and arms 100, 102 defining a substantially half-cylindrical opening 98. Wire jaw 90 is sized and shaped so as to be placed in recess 76 (FIG. 1). Wire jaw 90 further includes a plurality of teeth 96 defining a plurality of recesses 94. For example fifteen teeth 96 could be used. Teeth 96 are used to grip and set into a flange of a rail as is discussed below. Arm 102 further defines a wire opening 104 used to receive and maintain a wire 108. Arm 102 defines set screw openings 106 used to receive set screws 116. Set screws 116 may be used to mechanically maintain wire 108 within wire opening 104 and provide an electrically conductive connection. Other techniques and structures may be used to maintain wire 108 within wire opening 104 and provide an electrical connection. For example, wire 108 may be metallurgically bonded to wire jaw 90.

Referring to FIGS. 1-6, in use, clamp 50 is connected to a rail 110 (FIG. 6) having flanges 112 and 114 and a bottom 118. Nuts 58, 60 are loosened on base 56a. Wire 108 (FIG. 5) is inserted into and maintained in wire jaw 90 such as by soldering or by tightening set screws 116. J-hooked end 52 is placed under and attached to flange 114. Focusing on FIG. 6, while j-hooked end 52 is held in place against flange 114, wire jaw 90 is inserted into recess 76 between clamped end 54 and flange 112. Nut 60 is then tightened until spring 78 is fully compressed, thereby biasing clamped end 54 toward j-hooked end 52 due to clamped end 54 being moveably connected to j-hooked end 52. Nut 58 is then tightened against nut 60 providing redundant resistance to loosening caused by vibration.

Clamp 50 provides many benefits not available in the prior art. For example, teeth 96 provide multiple points of connection to rail 110. This structure effects higher contact pressure which provides better overall electrical contact and each contact point is smaller so there is less chance of causing cracks in the rail. Teeth 96 also impress past a first outer layer of rail 110 thereby passing through any potential rust layer. As rust is an oxide that may cause undesired resistance of electricity, passing through that rust layer provides increased electrical benefits.

Some prior art rail connection devices and structures have a single point of contact. In these structures, that single point can move resulting in decreased or no electrical connection. Use of only a single point of contact may require significant grip into the rail causing degradation of the rail. Spring 78 provides a substantially constant and continual bias of clamped end 54 toward j-hooked end 52. Prior art techniques require significant tightening upon installation which may result in degradation of the rail, necessitate special tools, and may need to be re-tightened over the course of time. Clamp 50 helps maintain a constant electrical connection between wire 108 and rail 110 over a wide range of temperature and vibration conditions resulting in relatively unchanged electrical resistance over time.

Having one end of clamp 50 with a j-hooked configuration and the other end with a clamp configuration provides benefits not available in the prior art. If both ends had clamp configurations, more space may be needed to insert a clamped end under rail 110. Clamp 50 can be easily removed as desired. Spring 78 provides benefits in that spring 78 can easily be placed on end 56b in a correct orientation. Moreover, a user can visually see when spring 78 is fully tightened, such as when spring 78 is solid. Prior art techniques simply instruct an installer to "tighten" but are not clear as to when to stop tightening which means under-tightening can occur. Clamp 50 also allows for the use of an oxide inhibiting substance such as dielectric grease between wire jaw 90 and rail 110 to enhance corrosion resistance of the established electrical connection.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A clamp comprising:
a first end;
a second end moveably connected to the first end; and
a wire jaw maintaining a wire, the wire jaw shaped so as to be placed in the second end, the wire jaw including a base, a first arm and a second arm each extending from the base, the first arm and the second arm defining an opening including teeth, the teeth effective to grip an object, the second arm defining a bore therethrough for maintaining the wire.

2. The clamp as recited in claim 1, wherein the wire jaw includes a coating to increase electrical conductivity of the wire jaw between the wire and the object.

3. The clamp as recited in claim 1, wherein:
the first end includes a base and a hooked portion; and
the second end includes a clamped portion, the second end being moveably connected to the base of the first end.

4. The clamp as recited in claim 3, further comprising:
a spring disposed on the base of the first end, the spring effective to bias the second end toward the hooked portion of the first end.

5. The clamp as recited in claim 4, further comprising a nut disposed on the base of the first end and effective to compress the spring toward the second end.

6. The clamp as recited in claim 1, wherein the clamp is effective to clamp a rail and the teeth are effective to grip a flange of the rail.

7. The clamp as recited in claim 1, wherein the wire is maintained in the wire jaw through set screws.

8. The clamp as recited in claim 3, wherein the first and second ends define respective recesses effective to receive a rail.

9. The clamp as recited in claim 3, wherein:
the first end includes a horizontal portion; and
the second end includes a flat portion substantially parallel to the horizontal portion of the first end.

10. The clamp as recited in claim 3, wherein:
the base of the first end includes a distal portion with a circular cross-section;
the second end includes first walls defining a hole effective to mate with the distal portion;
the base of the first end includes a portion with a first cross-section; and
the second end includes second walls defining a second cross-section larger than the first cross-section.

11. The clamp as recited in claim 1, wherein the wire is maintained in the wire jaw through metallurgical bonding.

12. A method for installing a clamp, the clamp including a first end including a base and a hooked portion, and a second end moveably connected to the base of the first end, the second end including a clamped portion, the method comprising:
inserting a wire into a wire jaw, the wire jaw including a base, a first arm and a second arm each extending from the base, the arms defining an opening including teeth, the teeth effective to grip an object, the second arm defining a bore therethrough for maintaining the wire;
attaching the hooked portion of the first end to an object;
inserting the wire jaw into the second end, and
biasing the second end toward the hooked portion of the first end.

13. The method as recited in claim 12, wherein the wire jaw includes a coating to increase electrical conductivity of the wire jaw between the wire and the object.

14. The method as recited in claim 12, wherein the biasing is performed by a spring disposed on the base of the first end.

15. The method as recited in claim 14, further comprising tightening a nut disposed on the base of the first end to compress the spring toward the second end.

16. The method as recited in claim 14, wherein the object is a rail and the teeth are effective to grip a flange of the rail.

17. The method as recited in claim 12, wherein the wire is maintained in the wire jaw through set screws.

18. The method as recited in claim 12, wherein the first and second ends define respective recesses effective to receive a rail.

19. The method as recited in claim 12, wherein:
the first end includes a horizontal portion; and
the second end includes a flat portion substantially parallel to the flat portion of the first end.

20. The method as recited in claim 12, wherein
the base of the first end includes a distal portion with a circular cross-section;
the second end includes first walls defining a hole effective to mate with the distal portion;
the base of the first end includes a portion with a first cross-section; and
the second end includes second walls defining a second cross-section larger than the first cross-section.

21. The method as recited in claim 12, wherein the wire is maintained in the wire jaw through metallurgical bonding.

22. A combination of a clamp and a rail, the combination comprising:
a clamp including:
a first end including a base and a hooked portion;
a second end moveably connected to the base of the first end, the second end including a clamped portion;
a wire jaw maintaining a wire, the wire jaw placed in the second end, the wire jaw including a base, a first arm and a second arm each extending from the base, the arms defining an opening including teeth, the teeth effective to grip a rail, the second arm defining a bore therethrough for maintaining the wire;
a spring disposed on the base of the first end, the spring effective to bias the second end toward the hooked portion of the first end;
the rail including a first flange, a second flange and a bottom, the teeth being effective to grip the first flange;
the first end includes a horizontal portion;
the second end includes a flat portion substantially parallel to the flat portion of the first end; and
the bottom of the rail sits on the flat portion of the first end and the flat portion of the second end.

23. The combination as recited in claim 22, wherein the wire jaw includes a coating to increase electrical conductivity of the wire jaw between the wire and the rail.

24. The combination as recited in claim 22, wherein the wire is maintained in the wire jaw through set screws.

25. The combination as recited in claim 22, wherein:
the base of the first end includes a distal portion with a circular cross-section;
the second end includes first walls defining a hole effective to mate with the distal portion;
the base of the first end includes a portion with a first cross-section; and
the second end includes second walls defining a second cross-section larger than the first cross-section.

26. The combination as recited in claim 22, wherein the wire is maintained in the wire jaw through metallurgical bonding.

* * * * *